(12) United States Patent
Woo et al.

(10) Patent No.: US 8,724,073 B2
(45) Date of Patent: May 13, 2014

(54) METHOD FOR MANUFACTURING LIQUID CRYSTAL DISPLAY DEVICE COMPRISING APPLYING ADHESIVE SOLUTION ON COLUMN SPACERS AND SIDEWALL

(71) Applicant: LG Display Co., Ltd., Seoul (KR)

(72) Inventors: Joung Won Woo, Gyeonggi-do (KR); Yuichi Momoi, Tokyo (JP); Dong Cheon Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/942,026

(22) Filed: Jul. 15, 2013

(65) Prior Publication Data
US 2013/0299067 A1    Nov. 14, 2013

Related U.S. Application Data

(62) Division of application No. 11/445,470, filed on Jun. 2, 2006, now Pat. No. 8,514,355.

(30) Foreign Application Priority Data

Jun. 3, 2005   (JP) ................. 2005-164030

(51) Int. Cl.
  *G02F 1/1339*  (2006.01)
  *G02F 1/1333*  (2006.01)
  *G02F 1/1341*  (2006.01)
  *C09K 19/52*   (2006.01)

(52) U.S. Cl.
  USPC ........... 349/190; 349/122; 349/153; 349/155; 349/163; 349/189

(58) Field of Classification Search
  USPC .......... 349/189, 190, 122, 153–157, 163, 187
  See application file for complete search history.

(56) References Cited

U.S. PATENT DOCUMENTS

| | | | |
|---|---|---|---|
| 4,874,461 A |   | 10/1989 | Sato et al. |
| 5,130,831 A |   | 7/1992  | Kohara et al. |
| 5,499,128 A |   | 3/1996  | Hasegawa et al. |
| 5,556,670 A |   | 9/1996  | Mihara et al. |
| 5,724,110 A | * | 3/1998  | Majima ................ 349/86 |

(Continued)

FOREIGN PATENT DOCUMENTS

| | | |
|---|---|---|
| JP | 63-050817 A | 3/1988 |
| JP | 02-201424 A | 8/1990 |
| JP | 2003-330029 A | 11/2003 |
| JP | 2004-012772 A | 1/2004 |

*Primary Examiner* — Lucy Chien
*Assistant Examiner* — Paisley L Arendt
(74) *Attorney, Agent, or Firm* — Morgan, Lewis & Bockius LLP

(57) ABSTRACT

A method for manufacturing a liquid crystal display (LCD) device includes preparing first and second substrates, at least one of the first and second substrates being a transparent substrate; forming a plurality of the column spacers on the first substrate for maintaining a cell gap between the first and second substrates and a sidewall on the first substrate for sealing the periphery of the substrates; applying an adhesive solution including an adhesive diluted with an organic solvent onto the first substrate having the column spacers and the sidewall thereon; positioning the second substrate on the first substrate so that the first and second substrates face each other; adhering the column spacers to the second substrate by drying the organic solvent from the adhesive solution; and providing a liquid crystal material between the first and second substrates.

6 Claims, 4 Drawing Sheets

(56) References Cited

U.S. PATENT DOCUMENTS

| | | |
|---|---|---|
| 5,898,041 A | 4/1999 | Yamada et al. |
| 5,919,606 A | 7/1999 | Kazlas et al. |
| 5,963,288 A | 10/1999 | Sato et al. |
| 6,049,366 A | 4/2000 | Hakemi et al. |
| 6,078,379 A * | 6/2000 | Nagae et al. .................. 349/155 |
| 6,211,937 B1 | 4/2001 | Miyachi et al. |
| 6,304,308 B1 | 10/2001 | Saito et al. |
| 6,795,138 B2 | 9/2004 | Liang et al. |
| 6,913,798 B2 | 7/2005 | Kitamura et al. |
| 7,182,830 B2 * | 2/2007 | Liang et al. ................... 156/292 |
| 2003/0214623 A1 | 11/2003 | Ebisu et al. |
| 2005/0270468 A1 | 12/2005 | Choi et al. |

* cited by examiner

FIG. 3

| Density | | 0.5% | | 1.0% | | 3.0% | |
|---|---|---|---|---|---|---|---|
| Sample Number | 1 | 2 | 3 | 1 | 2 | 1 | 2 |
| | | | | | | | |
| Adherence | x | x | x | x | x | ○ | ○ |
| Alignment of Liquid Crystal | — | — | — | — | — | ○ | ○ |

METHOD FOR MANUFACTURING LIQUID CRYSTAL DISPLAY DEVICE COMPRISING APPLYING ADHESIVE SOLUTION ON COLUMN SPACERS AND SIDEWALL

This application is a divisional of U.S. patent application Ser. No. 11/445,470, filed on Jun. 2, 2006, which claims the benefit of Japanese Patent Application No. JP 2005-164030, filed on Jun. 3, 2005, the entire disclosure of each of which is hereby incorporated by reference as if fully set forth herein for all purposes.

BACKGROUND OF THE INVENTION

1. Field of the Invention

The present invention relates to a liquid crystal display (LCD) device and a method for manufacturing the same.

2. Discussion of the Related Art

Among various flat displays, liquid crystal display (LCD) devices, plasma display panel (PDP) devices, field emission display (FED) devices, vacuum fluorescent display (VFD) devices, etc. are actively being studied and researched. Among these, LCD devices have attracted especially great attention because of their high picture quality, easy operation, mass production capability, etc.

An LCD device displays information on a screen using the refractivity and anisotropy of a liquid crystal material. The LCD device includes lower and upper substrates with a liquid crystal layer formed between the lower and upper substrates. Here, the liquid crystal layer functions as a switch for controlling the transmittance of light. In addition, spacers are provided between the lower and upper substrates to maintain a predetermined gap between the lower and upper substrates.

In a related art LCD panel, a column spacer is formed on one of two substrates facing each other, and the two substrates are sealed by a sealant. The column spacer is not bonded to the other facing substrate. Accordingly, in a large-sized display screen, the gap between the substrates is changed due to an external pressure on the screen, for example, by the touch of the user's finger. Thus, an electrode interval is also changed with the change of gap, and defects are generated on the display screen.

To solve this problem, the column spacer is cured by pressure and heat treatments so that the column spacer is bonded to the other facing substrate (for example, Japanese Patent Publication No. 2003-330029). However, if applying the pressure and heat, the column spacer is deformed due to the pressure when the two substrates are joined. Thus, precise gap control cannot be achieved.

To overcome this problem, an adhesive layer is formed on the upper surface of the column spacer by printing. That is, the column spacer is bonded to the other facing substrate by the adhesive layer (for example, Japanese Patent Publication No. 2004-12772).

If the adhesive layer is formed by printing, additional steps in manufacturing the device are necessary, thereby increasing the manufacturing cost and decreasing the yield. Also, the sealant for sealing the gap of the two substrates is formed of a thermocuring resin which has the adhesive property by itself. The sealant is formed on any one of the two substrates, and is bonded to the other facing substrate by pressure and heat. If using the adhesive layer, various problems (for example, incomplete curing or foreign material to the liquid crystal) may occur.

SUMMARY OF THE INVENTION

Accordingly, the present invention is directed to an LCD device and a method for manufacturing the same that substantially obviates one or more problems due to limitations and disadvantages of the related art.

An object of the present invention is to provide an LCD device and a method for manufacturing the same that simplifies a manufacturing process, realizes a uniform cell gap between two substrates, and decreases a gap size between the two substrates.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing a liquid crystal display device comprises preparing first and second substrates, at least one of the first and second substrates being a transparent substrate; forming a plurality of the column spacers on the first substrate for maintaining a cell gap between the first and second substrates and a sidewall on the first substrate for sealing the periphery of the substrates; applying an adhesive solution including an adhesive diluted with an organic solvent onto the first substrate having the column spacers and the sidewall thereon; positioning the second substrate on the first substrate so that the first and second substrates face each other; adhering the column spacers to the second substrate by drying the organic solvent from the adhesive solution; and providing a liquid crystal material between the first and second substrates.

In another aspect, a liquid crystal display device comprises a first substrate having a first alignment layer; a second substrate having a second alignment layer; a plurality of column spacers formed on the first substrate; and a sidewall formed along the periphery of the first substrate for sealing; wherein the column spacers and the sidewall are formed of the same polymer, and wherein upper surfaces of the column spacers and sidewall are bonded to the second substrate by an adhesive layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 illustrates a table showing an weight percent of an exemplary adhesive.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
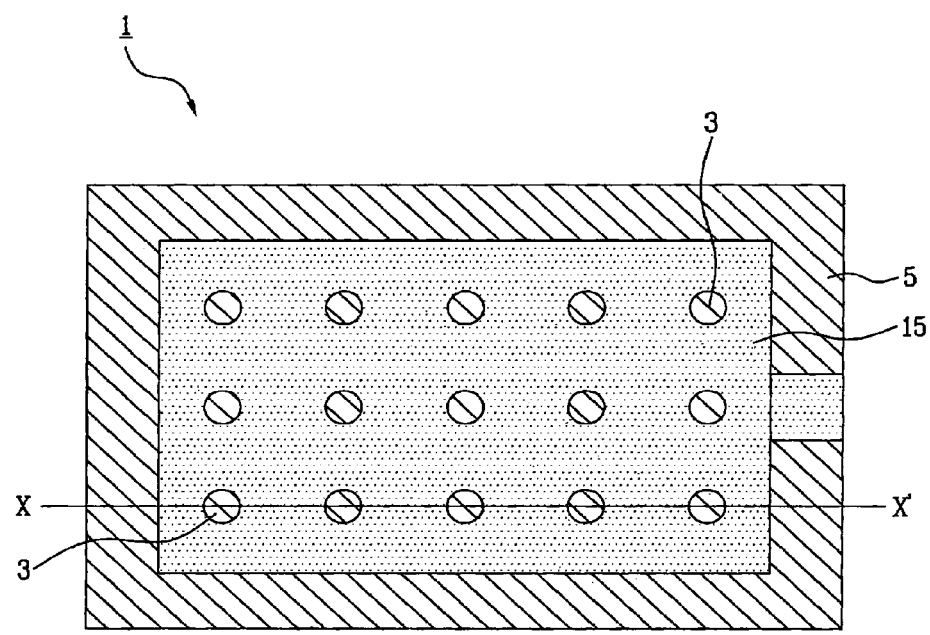
FIG. 1 illustrates a plane view of an exemplary LCD device according to the present invention.

FIG. 1 illustrates a plane view of an LCD device according to the present invention. As shown in FIG. 1, an LCD device 1 according to the present invention includes a pair of substrates, column spacers 3 for maintaining a gap between the two substrates, a sidewall 5 as a sealing member for sealing the periphery of the two substrates, and a liquid crystal 15 formed between the two substrates.

At least one of the two substrates is formed of a transparent material. In a first exemplary embodiment of the present invention, the substrate is formed of a glass substrate having a transparent electrode (hereinafter, referred to as an 'ITO') of, for example, a 5-inch size. The column spacers 3 and the sidewall 5 may be formed of a photo-sensitive resin at a height of about 3.5 μm. For example, the photo-sensitive resin includes polyimide, polyamide, polyvinylalcohol, polyacrylamid, cyclised rubber, novolac resin, polyester, polyurethane, acrylate resin, and bispenol. The liquid crystal 15 may be formed of any type used for LCD devices. For example, in the first embodiment of the present invention, a fluoride-type TN liquid crystal may be used.

An exemplary method for manufacturing the LCD device according to the present invention includes steps of forming the column spacers 3 and the sidewall 5 on any one of the two substrates, dropping an adhesive solution dissolved by an organic solvent onto the substrate including the column spacers 3 and the sidewall 5, facing the substrate on which the adhesive solution is dropped to the other substrate, bonding the two substrates to each other by drying the adhesive solution, and forming a liquid crystal layer by injecting liquid crystal 15 between the bonded two substrates.

Hereinafter, the detailed method for manufacturing the LCD devices according to the first and second embodiments of the present invention will be described with reference to FIGS. 2A to 2E which are cross sectional views along X-X' of FIG. 1.

Figure 2A:
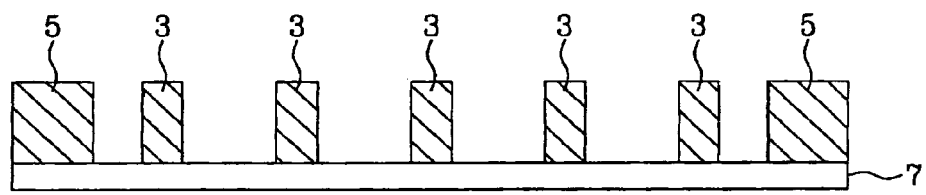
FIGS. 2A-2E illustrate a cross sectional view of an exemplary method for manufacturing an LCD device according to the present invention.

In a first embodiment, a column spacer and a sidewall are formed on any one of two substrates of an LCD device by photolithography will be described. FIG. 2A illustrates a cross sectional view of the LCD device when forming the column spacers 3 and the sidewall 5 on a first substrate 7.

First, a photosensitive resin for the column spacers 3 and the sidewall 5 is coated on the first substrate 7 by a spin coating method. Then, a solvent of the photosensitive resin is volatilized by pre-baking. Next, ultraviolet rays are applied to the photosensitive resin through a mask. The mask has a pattern corresponding to the column spacers 3 and the sidewall 5 being formed. The predetermined portions of the photosensitive resin corresponding to open portions of the mask are softened by the ultraviolet rays. Thereafter, a developer is applied to remove the softened portions of the photosensitive resin. The remaining photosensitive resin is cured by post-baking.

By the above photolithography, the column spacers 3 and the sidewall 5 are formed together at a height of about 3.5 μm, for example. In this case, the narrow sidewall 5 can be precisely manufactured. In the first embodiment of the present invention, the column spacers 3 and the sidewall 5 are formed at a height of about 3.5 μm, for example. However, the column spacers 3 and the sidewall 5 may be formed at a height between about 2 μm and about 10 μm, for example.

After forming the column spacers 3 and the sidewall 5 on the first substrate 7, the first substrate 7 including the column spacers 3 and the sidewall 5 is cleaned and dried. Subsequently, a polyimide (PI) is coated on the first substrate 7 including the column spacers 3 and the sidewall 5. In this case, the polyimide (PI) of the first embodiment may be formed of SE7492 (registered trademark) manufactured by Nissan Chemical Industries, Ltd. The first substrate 7 coated with polyimide (PI) is baked for 30 minutes at a temperature of 200° C. and then rubbed, thereby forming an alignment layer.

Figure 2B:
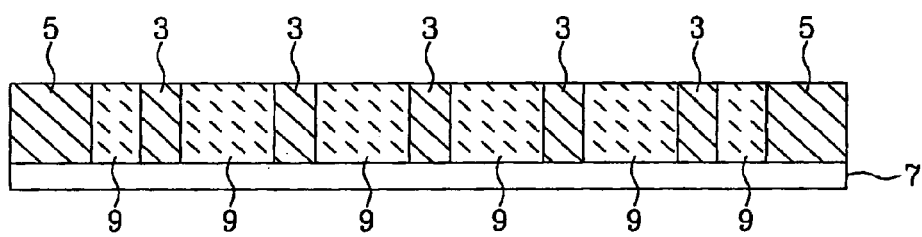

Thereafter, as shown in FIG. 2B, an adhesive solution 9 is dropped on the first substrate 7 including the alignment layer. FIG. 2B illustrates a cross sectional view of the LCD device when the adhesive solution 9 is dropped on the first substrate 7 having the alignment layer. At this time, the adhesive solution 9 contacts upper surfaces of the column spacer 3 and the sidewall 5. Here, the adhesive solution 9 may have a height of about 3.5 μm, for example.

The adhesive solution 9 may be formed of any material which dissolves the adhesive, for example, methyl ethyl ketone (hereinafter, referred to as "MEK"). The adhesive solution 9 should not be a strong dissoluble material that can damage the alignment layer, for example, acetone ($CH_3COCH_3$).

The adhesive solution 9 may be formed of any material that causes no trouble in the function of liquid crystal to control light transmittance. That is, molecules of the adhesive solution having a very similar shape and size as molecules of the liquid crystal are suitable. A thermocuring resin of a mesogen group is particularly well suited.

In the first exemplary embodiment of the present invention, the thermocuring resin having the mesogen group may be formed of YX4000 (registered trademark) manufactured by Japan Epoxy Resin Inc., which is pure biphenyl-based epoxy resin. In addition to the thermocuring resin of epoxy resin, acrylate resin or aryl resin may be used for the thermocuring resin. To form the adhesive solution 9, YX4000 is dissolved in the organic solvent of MEK, thereby forming a saturated solution having an weight percent of 20%. After that, the saturated solution is diluted with ethyl alcohol ($C_2H_5OH$), thereby forming the adhesive solution 9. After dropping the adhesive solution 9, the two substrates are positioned to face each other. As the organic solvent dries, the adhesive is bonded to the other facing substrate.

Figure 2C:
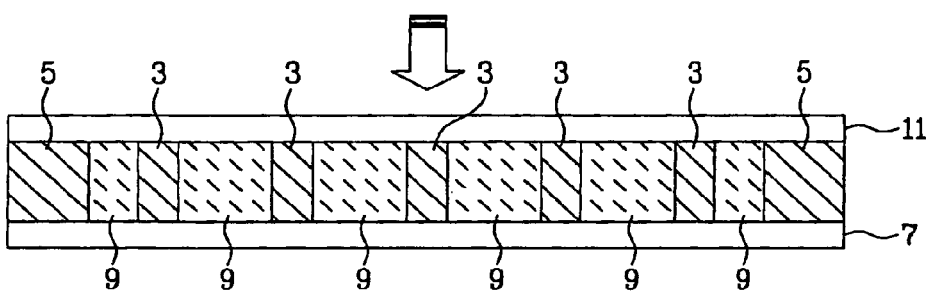

FIG. 2C illustrates a cross sectional view of the LCD device when the first substrate 7 faces the second substrate 11 after the adhesive solution 9 is dropped. At this time, the second substrate 11 has an alignment layer formed by rubbing.

Figure 2D:
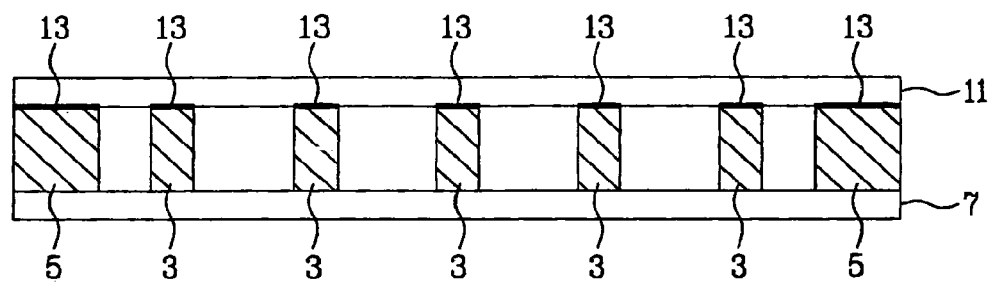

FIG. 2D illustrates a cross sectional view of the LCD device after the organic solvent of the adhesive solution 9 is dried. A method for drying the organic solvent of the adhesive solution 9 will be explained as follows.

First, the first and second substrates 7 and 11 are fixed by a metal jig. Then, for example, the fixed first and second substrates 7 and 11 are put in a heat chamber for 6 hours at a temperature of 160° C., thereby drying the organic solvent of the adhesive solution 9. After drying the organic solvent, an adhesive layer 13 is formed on the upper surfaces of the column spacers 3 and the sidewall 5. Accordingly, the column spacers 3 and the sidewall 5 are bonded to the second substrate 11 by the adhesive layer 13. In the meantime, the adhesive layer 13 is left on the alignment layers of the first and second substrates 7 and 11 and the lateral surfaces of the column spacers 3 and sidewall 5 (not shown). At this time, the adhesive of the adhesive layer 13 has a mesogen group of a molecule that is very similar in structure to the liquid crystal. Accordingly, detrimental effects on the alignment layers can be avoided.

In the related art, a thickness of an adhesive coated between a spacer and a substrate corresponds to 10% of a height of the spacer. Therefore, due to the thickness of the coated adhesive, it is difficult to realize the uniformity of adhesive when the spacer is bonded to the substrate. Thus, a wide adhesion portion in the upper surface of the spacer is required.

In the present invention, the adhesive layer 13 is thinly formed in the upper surfaces of the column spacers 3 and the sidewall 5. Thus, the adhesive layer 13 can be prevented from spreading non-uniformly. In this respect, the width of the upper surface of the sidewall 5 can be decreased. After drying the deposited adhesive solution 9, the adhesive layer 13 formed on the upper surfaces of the column spacers 3 and the sidewall 5 and on the alignment layers of the first and second substrates 7 and 11 has a thickness, for example, between about $5 \times 10^{-3}$ μm and about $5 \times 10^{-1}$ μm.

Figure 2E:
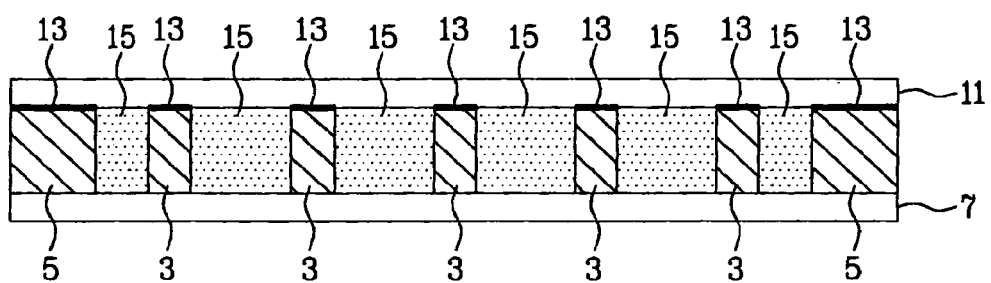

FIG. 2E illustrates a cross sectional view of the LCD device when liquid crystal is injected between the two substrates. The liquid crystal 15 is injected until completely filling the space enclosed by the first substrate 7, the second substrate 11 and the sidewall 5. In the above process, the LCD device 1 of FIG. 1 is completed.

The weight percent of the adhesive solution 9 will be explained as follows. FIG. 3 illustrates a table of showing the weight percent of the adhesive. At this time, when adhesive solutions 9 having respective weight percents of 0.5%, 1.0% and 3.0% are applied, the adherence and alignment of liquid crystal are explained when manufacturing the LCD device under the weight percent of adhesive solution 9 at 0.5%, 1.0% and 3.0%.

In the table of FIG. 3, the adherence shows whether the column spacers 3 and the sidewall 5 are well bonded to the substrate or not. If providing the weight percent of 0.5% and 1.0%, all samples have the mark 'X'. If providing the weight percent of 3.0%, all samples have the mark 'O'. At this time, the mark 'X' shows the weak adherence between the substrate and the column spacers 3 and sidewall 5, whereby both the column spacers 3 and the sidewall 5 are not bonded to the substrate. The mark 'O' shows the strong adherence between the substrate and the column spacers 3 and sidewall 5, whereby both the column spacers 3 and the sidewall 5 are well bonded to the substrate.

In the table of FIG. 3, the alignment of liquid crystal shows whether the liquid crystal 15 injected between the two substrates functions as the switch for controlling the light transmittance according to an electric signal output from an electrode after drying the organic solvent, or not. If the weight percent of adhesive solution is 0.5% and 1.0%, the column spacers 3 and sidewall 5 are not bonded to the substrate. Thus, the liquid crystal cannot be injected between the two substrates. Accordingly, these cases are not included.

If the weight percent of adhesive solution is 3.0%, all samples show the mark 'O', that is, the liquid crystal 15 normally functions as the switch for controlling the light transmittance between the two substrates. In the experimental results from the table of FIG. 3, preferably, the weight percent of adhesive provided in the adhesive solution 9 is 1% or more. For example, YX4000 and MEK are dissolved with a mixed solvent of ethyl alcohol, whereby an weight percent of saturated state is 80% at a temperature of 30° C. However, preferably, the weight percent of adhesive provided in the adhesive solution 9 of the present invention is between about 1% and about 15%. More preferably, the weight percent is between about 3.0% and about 10%.

A relation between the liquid crystal and the adhesive will be explained as follows. The property of liquid crystal largely depends on the shape of molecules. That is, the molecule of liquid crystal has the thin and long shape, which shows the peculiar property of liquid crystal.

If the foreign material having the different shape is mixed with the molecule of liquid crystal, the property of liquid crystal is changed. When the spacers are mixed to the liquid crystal, the spacers are a foreign material to the liquid crystal. The foreign material of the spacers may have bad effects on the liquid crystal. The present invention can decrease the effects on the liquid crystal caused by the spacers.

The adhesive used in the present invention is YX4000 of the biphenyl-based epoxy resin, which has the following chemical formula.

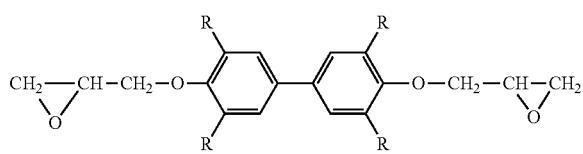

In this preferred embodiment of the present invention, the liquid crystal is fluoride-type TN liquid crystal, a mixture of simple substances. Each simple substance of the fluoride-type TN liquid crystal has the following chemical formula.

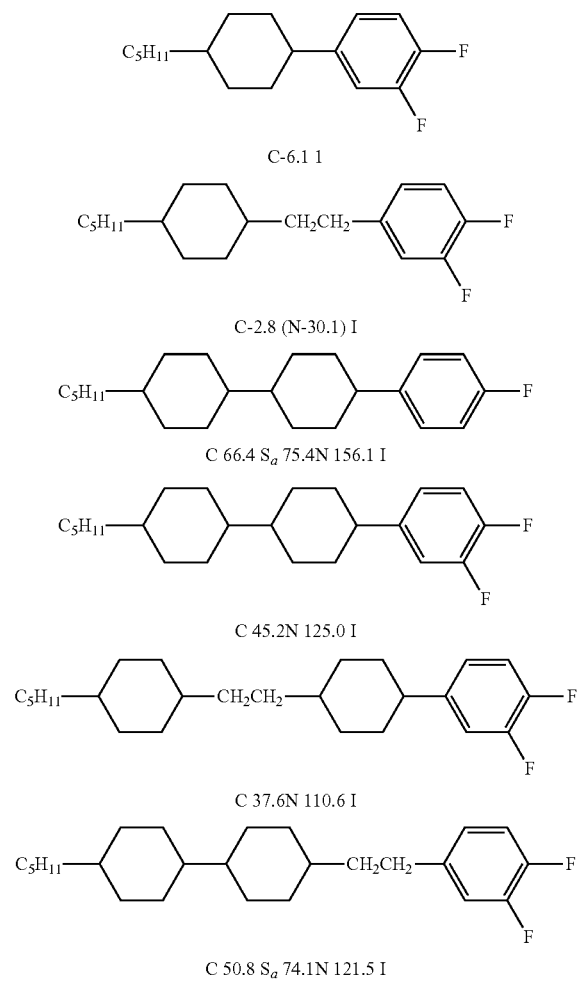

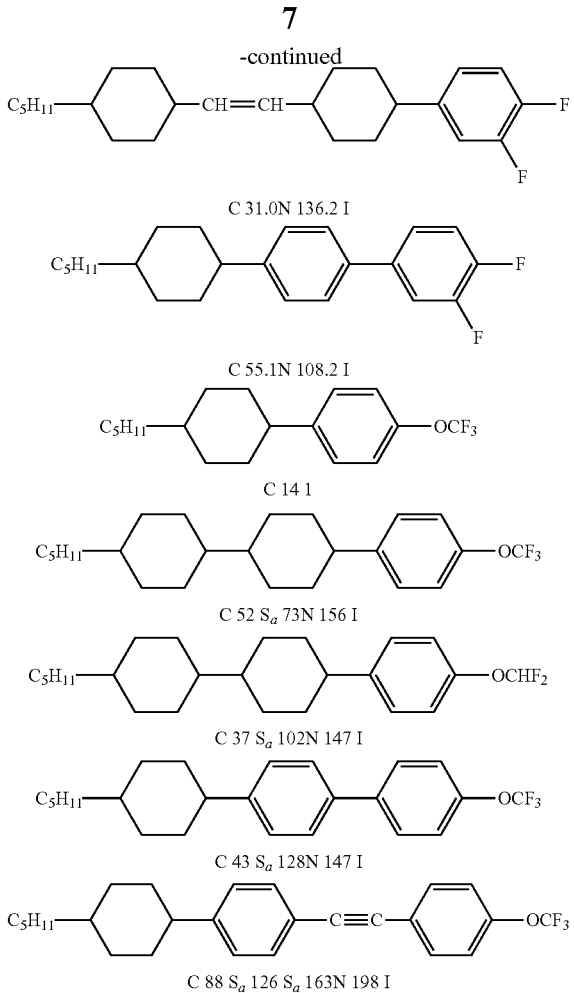

The molecule of YX4000 for the adhesive layer 13 is similar in shape and weight to the molecule of liquid crystal 15 of the fluoride-type TN liquid crystal. Even though some of the adhesive is mixed with the liquid crystal after the column spacers 3 and the sidewall 5 are bonded to the second substrate 11, there are no bad effects on the property of liquid crystal 15 due to the similar molecular structure.

At this time, the molecule of YX4000 is a structure of biphenyl. If a structure of cycloxane as well as a structure of biphenyl is mixed with the liquid crystal 15, the molecular has the mesogen structure which is similar in structure to the liquid crystal so that it has no bad effects on the property of liquid crystal 15.

In the meantime, the molecular relation between the adhesive layer 13 and the liquid crystal 15, and the weight percent of the adhesive solution 9 make no interference with the function of alignment layers formed on the first and second substrates 7 and 11.

As explained above, the column spacers 3 and the sidewall 5 are formed together on the first substrate 7 by photolithography. Then, the adhesive solution 9 is dropped on the first substrate 7, and the second substrate 11 is positioned above the first substrate 7. Thereafter, the organic solvent is dried so that the adhesive layer 13 is thinly formed on the upper surfaces of the column spacers 3 and sidewall 5. As a result, the column spacers 3 and the sidewall 5 are bonded to the second substrate 11.

In comparison to the related art LCD device, the LCD device of the present invention has a simplified process when the first substrate having the column spacer is bonded to the facing second substrate. Also, the uniformity of cell gap between the two substrates can be improved. Moreover, the interval between the two substrates can be decreased.

In the method for manufacturing the LCD device according to the present invention, the sidewall 5 has the appropriate adherence. Also, the sidewall 5 may be formed of the photosensitive resin instead of the thermocuring resin, which has the adherence by itself since the material of the adhesive layer has no bad effects on the alignment layer. Accordingly, the column spacers 3 and the sidewall 5 of the same photosensitive resin are patterned at the same time.

In an LCD device according to a second exemplary embodiment of the present invention, an organic solvent of an adhesive solution is dried in a pressure-reducing method. Hereinafter, the same reference numbers will be used so as to refer to the same or like parts as the first exemplary embodiment of the present invention.

In the process for bonding first and second substrates 7 and 11 to each other with an adhesive formed by drying an organic solvent from an adhesive solution 9, the first substrate 7, on which the adhesive solution 9 is dropped, and the facing second substrate 11 are maintained under the vacuum state by a pressure-reducing drier. In the pressure-reducing drier, the organic solvent of the adhesive solution 9 is dried, thereby forming an adhesive layer 13. Accordingly, as shown in FIG. 2D, column spacers 3 and a sidewall 5 are bonded to the second substrate 11 by the adhesive layer 13.

In the process for bonding the two substrates to each other by the adhesive layer in the LCD device according to the second exemplary embodiment of the present invention, the organic solvent is dried under a vacuum state by reducing the pressure.

As mentioned above, the LCD device and method for manufacturing the same according to the present invention has a number of advantages. For example, in the LCD device and method for manufacturing the same according to the present invention, the column spacers and the sidewall are formed together on one substrate by photolithography. Then, the adhesive solution is dropped on the substrate, and the organic solvent of the adhesive solution is dried so that the adhesive layer is formed on the upper surfaces of the column spacers and the sidewall. As a result, the column spacers and the sidewall are bonded to the facing substrate by the adhesive layer. Accordingly, the manufacturing process can be simplified, thereby improving the uniformity of cell gap between the substrates and decreasing the interval between the substrates.

It will be apparent to those skilled in the art that various modifications and variations can be made in the liquid crystal display device and method for manufacturing the same of the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display (LCD) device, the method comprising:
    preparing first and second substrates, at least one of the first and second substrates being a transparent substrate;
    forming a plurality of column spacers on the first substrate for maintaining a cell gap between the first and second substrates and a sidewall on the first substrate for sealing a periphery of the substrates;

applying an adhesive solution including an adhesive diluted with an organic solvent onto the first substrate having the column spacers and the sidewall thereon;

positioning the second substrate on the first substrate so that the first and second substrates face each other;

adhering the column spacers and sidewall to the second substrate by drying the organic solvent from the adhesive solution; and providing a liquid crystal material between the first and second substrates, the liquid crystal material being mixed with an adhesive, wherein the adhesive solution on the column spacers and sidewall and the adhesive mixed with the liquid crystal material are formed of a same adhesive, and wherein the drying of the adhesive solution is performed by heating or pressure reduction.

2. The method of claim 1, wherein the column spacers and the sidewall are formed of a polymer-based material by photolithography.

3. The method of claim 1, wherein the adhesive included in the adhesive solution has a weight percent between 3% and 10% of the adhesive solution.

4. The method of claim 3, wherein the adhesive includes a thermocuring resin having mesogen.

5. The method of claim 4, wherein the thermocuring resin corresponds to an epoxy resin.

6. The method of claim 1, wherein the operation of providing the liquid crystal material between the first and second substrates includes injecting the liquid crystal material between the first and second substrates.

* * * * *